Dec. 18, 1945.  G. CODISH  2,390,991

APPARATUS FOR MAKING SHOE SOLES

Filed Dec. 26, 1944  2 Sheets-Sheet 1

INVENTOR
George Codish
BY
J. B. Felshin
ATTORNEY

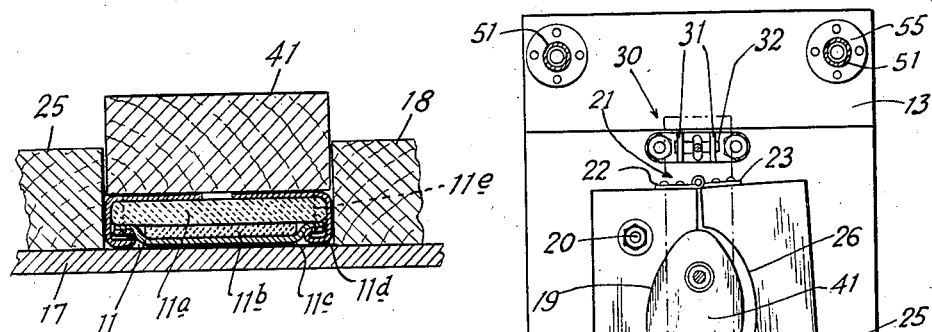
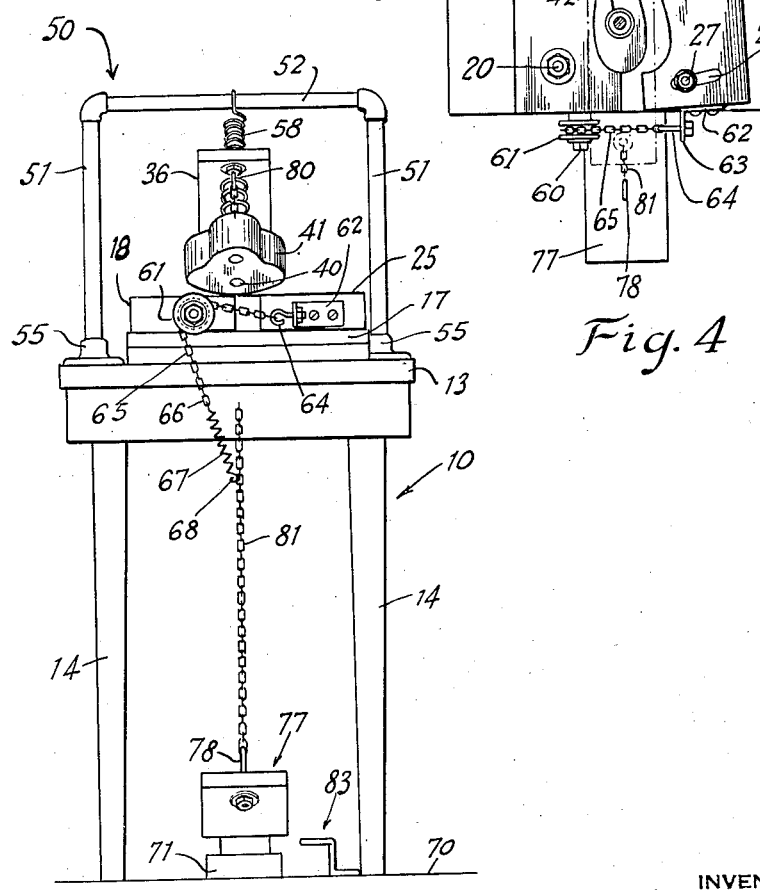

Patented Dec. 18, 1945

2,390,991

UNITED STATES PATENT OFFICE 2,390,991

APPARATUS FOR MAKING SHOE SOLES

George Codish, New York, N. Y.

Application December 26, 1944, Serial No. 569,669

17 Claims. (Cl. 12—17)

This invention relates to apparatus for making shoe soles.

An object of this invention is to provide apparatus for making soles comprising a pair of split mold members pivoted together and having cutouts which together form a mold cavity for a sole, and an insert adapted to be pressed into the mold cavity, whereby to exert downward as well as lateral pressure on a sole within the mold cavity.

Another object of this invention is to provide resilient means to press the pivoted mold sections together and resilient means to press the insert into the mold cavity.

A further object of this invention is to provide apparatus of the character described including a foot pedal and means to close the pivoted mold sections together and depress the insert upon depressing the foot pedal, said apparatus being so constructed that the mold sections are closed before the insert is pressed into the cavity.

Yet another object of this invention is to provide means for opening up the mold sections and lifting up the insert, upon releasing the foot pedal.

Yet a further object of this invention is to provide strong and durable apparatus of the character described which shall be inexpensive to manufacture, easy to manipulate and yet practical and efficient to a high degree.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawings in which is shown one of the various possible illustrative embodiments of this invention, Fig. 1 is a side elevational view of apparatus embodying the invention with parts broken away and in cross-section;

Fig. 3 is a front elevational view of the apparatus shown in Fig. 1;

Fig. 4 is a cross-sectional view taken on line 4—4 of Fig. 2; and

Fig. 5 is a cross-sectional view taken on line 5—5 of Fig. 2.

Figure 2:
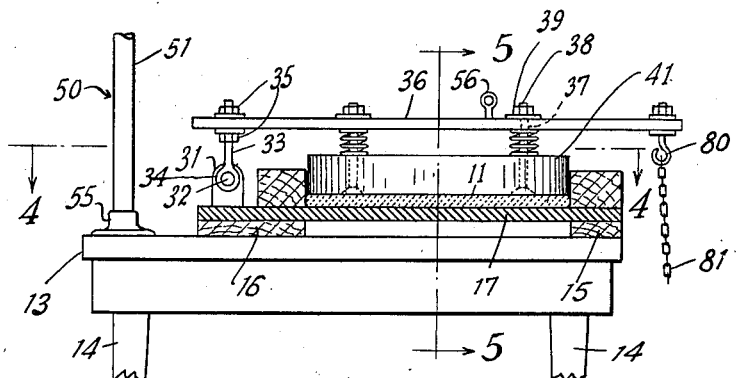
Fig. 2 is a partial side elevational view of the apparatus shown in Fig. 1 with the insert within the mold cavity, with parts of the apparatus in cross-section.

Referring now in detail to the drawings, 10 designates apparatus embodying the invention for shaping and molding a shoe sole 11. The apparatus 10 comprises a table 12, comprising a table top 13 provided with supporting legs 14. On the table top 13 are a pair of parallel spaced slats 15 and 16 parallel to the front edge of the table. Mounted on the slats 15 and 16 is a horizontal metal plate 17. Fixed to the top of plate 17 is a mold section 18 having a mold edge 19 constituting a longitudinal half of a sole mold cavity. Member 18 may be fixed to plate 17 by means of screws 20 or by any other fastening means. Fixed to the rear edge of mold section 18 is a hinge 21 having one leaf 22 fixed to said mold section. Fixed to the other leaf 23 of hinge 21 and slidably mounted on plate 17 is a complementary mold section 25 having a cutout or mold edge 26 complementary to mold edge 19 and together therewith forming a mold cavity for receiving a sole. Thus when the mold sections 18 and 25 are closed up, they together form a mold cavity in which the sole 11 may be compressed.

Figure 1:
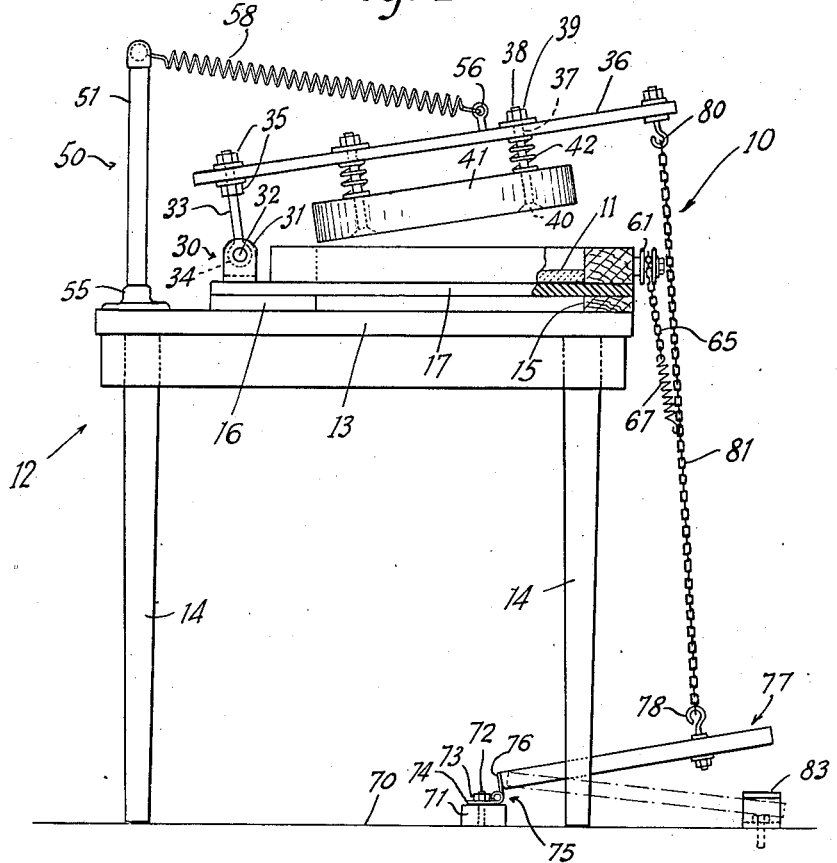

Fixed to plate 17 is a headed pin 27 extending through a slot 28 in mold section 25. Pin 27 is a guide for a pivot mold section 25 to guide the latter as it is pivoted toward and away from mold section 18 and to keep said mold section on plate 17. Fixed to the rear end of plate 17 and in back of mold sections 18 and 25 is a bracket 30 comprising a pair of parallel upstanding apertured ears 31 supporting a transverse pivot pin 32. Pivoted onto the pivot pin 32 is an eye bolt 33 having an eye 34 receiving the pivot pin. On the eye bolt 33 are a pair of spaced nuts 35. Fixed to the eye bolt by means of the nuts 35 is a bar 36 extending forwardly. Bar 36 is formed with a pair of vertical through openings 37. Slidably extending therethrough are screws 38. Screwed to the upper ends of screws 38 are nuts 39. At the lower ends of screws 38 are heads 40. Mounted on said screws and engaging the heads 40 is a sole shaped mold insert 41 adapted to be received within the mold cavity. Interposed between the insert 41 and the underside of plate 36 and surrounding the screws 38 are coil compression springs 42. It will now be understood that when bar 36 is pivoted downwardly or in a clockwise direction, looking at Fig. 1, the insert 41 will be received within the mold cavity and bar 36 will compress springs 42 to exert a yielding pressure on the insert which is transferred to the sole 11.

Means is provided to lift the insert out of the mold cavity. To this end there is fixed to the rear of the table 12 a bracket 50 having upstanding spaced legs 51 interconnected by a top cross member 52. The legs 51 are fixed to the rear of the table by means of brackets 55. Interconnecting the cross member 52 with an eye screw 56 screwed to bar 36, is a coil tension spring 58. Spring 58 urges bar 36 to swing upwardly.

Means is provided to swing jaw 25 toward mold section 18 and to also depress the insert 41 into the mold cavity. To this end there is fixed to the front end of mold section 18 a horizontal forwardly extending pin 60. Rotatably mounted on pin 60 is a groove roller or pulley 61. Also fixed to the front end of mold section 25 is a bracket 62 having a forwardly extending finger 63. Fixed to the finger 63 is a hook 64. Attached to hook 64 is a chain or cable or other flexible member 65 which extends around the roller 61. Attached to the lower end 66 of chain 65 is a coil tension spring 67 having a hooked end 68 for the purpose hereinafter appearing.

Attached to the floor 70, beneath the table, is a block 71 carrying a vertical pivot pin 72. Screwed to the upper end of the pivot pin 72 is a nut 73. Pivoted to the pivot pin 72 and engaging beneath the nut 73, is one leaf 74 of a hinge 75. Said hinge 75 has a second leaf 76. It will be noted that the hinge 75 may pivot about the vertical pin 72. Attached to leaf 76 of hinge 75 is a foot pedal 77 extending forwardly therefrom. Attached to the foot pedal is a hook 78. There is also attached to the forward end of bar 36, another hook 80. Interconnecting the hooks 78 and 80 is a chain, cable or other flexible connector 81. The lower hooked end 68 of the coil tension spring 67 is connected to an intermediate portion of the chain 81. It will now be understood that upon depressing the foot pedal 77, pivoted member 25 will first move towards the mold section 18 under influence of spring 67, and bar 34 will also be depressed to move the insert into the mold cavity. Attached to the floor is a Z-shaped bracket 83 beneath which the foot pedal may be engaged as shown in dot-dash lines in Fig. 1, to maintain the mold in compressed condition. It will be noted that the foot pedal is pivoted about a vertical axis to permit side movement of the foot pedal into engagement with bracket 83, and to release the foot pedal from said bracket. When the foot pedal is released spring 58 serves to lift up plate 36 and also to relieve tension on hook 67. The arrangement is such that the mold sections close before the insert is fully depressed into the mold cavity. Obviously chain 81 can move down after the mold sections are closed, because of the spring 67.

In Fig. 5 there is shown a sole 11 illustrating one type of sole which may be molded in the mold. The sole 11 comprises a top layer 11a and a layer 11b at the underside thereof and adhered thereto. The layer 11a is of smaller size than the layer 11b. At the underside of layer 11b is another layer 11c of fabric contacting the underside of layer 11a adjacent its outer edge. Stitched to layers 11c and 11a is a binding edge 11d which is folded back French fashion, and contacts the outer edge of layer 11a and the top surface thereof. The stitching is designated by numeral 11e. The binding edge 11d is glued to the top of the layer 11a. The mold members 18 and 25 press the binding edge against the edge of layer 11a and the insert 41 presses the top portion of the binding edge down against said layer 11a. Although, the drawings illustrate one type of sole which may be pressed by the apparatus shown herein, it will be obvious that many other types of soles may be compressed, molded, or shaped with said apparatus.

It will thus be seen that there is provided a device in which several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:

1. Apparatus of the character described comprising a table, a plate fixed to the table, a mold section fixed to the plate, a second mold section pivoted to the first section about a vertical axis, said mold sections having complementary cutouts, together forming a mold cavity, a horizontal pivot pin on said table, a member pivoted to said horizontal pivot pin, an insert slidably mounted on said member, spring means interposed between the insert and said member, and said insert being movable into the mold cavity.

2. Apparatus of the character described comprising a table, a plate fixed to the table, a mold section fixed to the plate, a second mold section pivoted to the first section about a vertical axis, said mold sections having complementary cutouts, together forming a mold cavity, a horizontal pivot pin on said table, a member pivoted to said horizontal pivot pin, an insert slidably mounted on said member, spring means interposed between the insert and said member, said insert being movable into the mold cavity, and spring means to lift said member for withdrawing the insert from said mold cavity.

3. Apparatus of the character described comprising a table, a plate fixed to the table, a mold section fixed to the plate, a second mold section pivoted to the first section about a vertical axis, said mold sections having complementary cutouts, together forming a mold cavity, a horizontal pivot pin on said table, a member pivoted to said horizontal pivot pin, an insert slidably mounted on said member, spring means interposed between the insert and said member, said insert being movable into the mold cavity, spring means to lift said member for withdrawing the insert from said mold cavity, a foot pedal, and means interconnecting said member and foot pedal for depressing the insert into the mold cavity upon depressing said foot pedal.

4. Apparatus of the character described comprising a table, a plate fixed to the table, a mold section fixed to the plate, a second mold section pivoted to the first section about a vertical axis, said mold sections having complementary cutouts, together forming a mold cavity, a horizontal pivot pin on said table, a member pivoted to said horizontal pivot pin, an insert slidably mounted on said member, spring means interposed between the insert and said member, said insert being movable into the mold cavity, spring means to lift said member for withdrawing the insert from said mold cavity, a foot pedal, and means interconnecting said member and foot pedal for depressing the insert into the mold cavity, upon depressing said foot pedal, and means connected to said interconnecting means to swing the pivoted mold section toward the fixed mold section upon depressing said foot pedal.

5. In apparatus of the character described, a fixed mold section, a pivoted mold section, said mold sections having complementary cutouts together forming a sole cavity, a roller on the fixed mold section, a flexible member attached to the pivoted mold section and engaged around the roller, and a foot pedal to pull the flexible member for swinging the pivoted mold section toward the fixed mold section.

6. In apparatus of the character described, a fixed mold section, a pivoted mold section, said mold sections having complementary cutouts together forming a sole cavity, a roller on the fixed mold section, a flexible member attached to the pivoted mold section and engaged around the roller, a foot pedal to pull the flexible member for swinging the pivoted mold section toward the fixed mold section, and means for holding the foot pedal in depressed condition.

7. In apparatus of the character described, a fixed mold section, a pivoted mold section, said mold sections having complementary cutouts together forming a sole cavity, a roller on the fixed mold section, a flexible member attached to the pivoted mold section and engaged around the roller, a foot pedal to pull the flexible member for swinging the pivoted mold section toward the fixed mold section, means for holding the foot pedal in depressed condition, and spring means interposed on said flexible member.

8. Apparatus of the character described comprising a pair of complementary mold sections having cutout edges together forming a mold cavity, said sections being relatively movable toward and away from each other, means to resiliently press said mold sections together, an insert movable into the mold cavity, and means to resiliently press said insert into said cavity.

9. A pair of complementary mold sections together forming a mold cavity, said mold sections being relatively movable toward and away from each other, a member movable toward and away from the mold cavity, an insert mounted on said member and adapted to enter the mold cavity, springs interposed between the insert and said member, adapted to resiliently press the insert into the mold cavity, means connected to said member to move the same in a direction permitting the insert to enter the mold cavity, and means controlled by the last means to move said mold sections together.

10. Apparatus of the character described comprising a pair of complementary co-planar sections together forming a mold cavity, an insert disposed above the mold cavity, a foot pedal, means on the foot pedal to depress the insert into the mold cavity, and means controlled by the last means to move said mold sections together.

11. Apparatus of the character described comprising a pair of complementary co-planar sections together forming a mold cavity, an insert disposed above the mold cavity, a foot pedal, means on the foot pedal to depress the insert into the mold cavity, and means controlled by the last means to move said mold sections together, and means to remove the insert from the mold cavity upon releasing the foot pedal.

12. Apparatus of the character described comprising a pair of complementary co-planar sections together forming a mold cavity, an insert disposed above the mold cavity, a foot pedal, means on the foot pedal to depress the insert into the mold cavity, and means controlled by the last means to move said mold sections together, means to remove the insert from the mold cavity upon releasing the foot pedal, and means to retain the foot pedal in a position with the insert within the mold cavity.

13. Apparatus of the character described comprising a table, a plate on said table, a mold section fixed on top of the plate, a complementary mold section pivoted to the first mold section and mounted on said plate for movement toward and away from the first mold section, a bracket fixed to the plate, a member pivoted to the bracket about a horizontal axis, and extending upwardly therefrom, a bar fixed to said member and extending forwardly therefrom, an insert slidably mounted on the bar and disposed beneath the bar and adapted to be received within the mold cavity, a hinge having a horizontal axis, means to pivot one leaf of the hinge about a vertical axis, a foot pedal attached to the other leaf of the hinge, and means to connect the foot pedal to said bar.

14. Apparatus of the character described comprising a table, a plate on said table, a mold section fixed on top of the plate, a complementary mold section pivoted to the first mold section and mounted on said plate for movement toward and away from the first mold section, a bracket fixed to the plate, a member pivoted to the bracket about a horizontal axis, and extending upwardly therefrom, a bar fixed to said member and extending forwardly therefrom, an insert slidably mounted on the bar and disposed beneath the bar and adapted to be received within the mold cavity, a hinge having a horizontal axis, means to pivot one leaf of the hinge about a vertical axis, a foot pedal attached to the other leaf of the hinge, means to connect the foot pedal to said bar, and a bracket to retain the foot pedal in depressed condition.

15. Apparatus of the character described comprising a table, a plate on said table, a mold section fixed on top of the plate, a complementary mold section pivoted to the first mold section and mounted on said plate for movement toward and away from the first mold section, a bracket fixed to the plate, a member pivoted to the bracket about a horizontal axis, and extending upwardly therefrom, a bar fixed to said member and extending forwardly therefrom, an insert slidably mounted on the bar and disposed beneath the bar and adapted to be received within the mold cavity, a hinge having a horizontal axis, means to pivot one leaf of the hinge about a vertical axis, a foot pedal attached to the other leaf of the hinge, means to connect the foot pedal to said bar, a bracket to retain the foot pedal in depressed condition, an idler fixed to the table, and a flexible member attached to said pivoted section, and extending over the idler, and connected to said connecting means.

16. Apparatus of the character described comprising a table, a plate on said table, a mold section fixed on top of the plate, a complementary mold section pivoted to the first mold section and mounted on said plate for movement toward and away from the first mold section, a bracket fixed to the plate, a member pivoted to the bracket about a horizontal axis, and extending upwardly therefrom, a bar fixed to said member and extending forwardly therefrom, an insert slidably mounted on the bar and disposed beneath the bar and adapted to be received within the mold cavity, a hinge having a horizontal axis, means to pivot one leaf of the hinge about a vertical axis, a foot pedal attached to the other leaf of the hinge, means to connect the foot pedal to said bar, a bracket to retain the foot pedal in depressed condition, an idler fixed to the table, a flexible member attached to said pivoted section, and extending over the idler, and connected to said connecting means, and spring means interposed between said insert and bar.

17. Apparatus of the character described comprising a table, a plate on said table, a mold section fixed on top of the plate, a complementary mold section pivoted to the first mold section and mounted on said plate for movement toward and away from the first mold section, a bracket fixed to the plate, a member pivoted to the bracket about a horizontal axis, and extending forwardly therefrom, an insert slidably mounted on the bar and disposed beneath the bar and adapted to be received within the mold cavity, a hinge having a horizontal axis, means to pivot one leaf of the hinge about a vertical axis, a foot pedal attached to the other leaf of the hinge, means to connect the foot pedal to said bar, and spring means interposed between said insert and bar.

GEORGE CODISH.